United States Patent
Katoh

(10) Patent No.: US 12,113,165 B2
(45) Date of Patent: Oct. 8, 2024

(54) METHOD FOR PRODUCING ELECTRODES FOR ALL-SOLID STATE BATTERIES

(71) Applicant: TOYOTA MOTOR EUROPE, Brussels (BE)

(72) Inventor: Yuki Katoh, Brussels (BE)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 16/635,580

(22) PCT Filed: Aug. 4, 2017

(86) PCT No.: PCT/EP2017/069858
§ 371 (c)(1),
(2) Date: Jan. 31, 2020

(87) PCT Pub. No.: WO2019/025014
PCT Pub. Date: Feb. 7, 2019

(65) Prior Publication Data
US 2020/0243900 A1 Jul. 30, 2020

(51) Int. Cl.
*H01M 10/0562* (2010.01)
*C01G 23/00* (2006.01)
(Continued)

(52) U.S. Cl.
CPC ...... *H01M 10/0562* (2013.01); *C01G 23/002* (2013.01); *H01M 4/5825* (2013.01);
(Continued)

(58) Field of Classification Search
CPC ........... H01M 10/0562; H01M 10/052; H01M 4/5825; H01M 2300/0068; C01G 23/002; C01P 2002/72; C01P 2002/74
(Continued)

(56) References Cited

U.S. PATENT DOCUMENTS 4,917,976 A * 4/1990 Wakihara ............... H01M 4/02
429/220
2011/0240108 A1* 10/2011 Law .................... C23C 16/4417
136/255
(Continued)

FOREIGN PATENT DOCUMENTS

CN 103401017 A 11/2013
CN 103401017 B * 9/2015
(Continued)

OTHER PUBLICATIONS

Roura et al., "Is sintering enhanced under non-isothermal conditions?", Jan. 7, 2002, Materials Science and Engineering A337 (2002) 248-253 (Year: 2002).*
(Continued)

*Primary Examiner* — Matthew T Martin
*Assistant Examiner* — Paul Christian St Wyrough
(74) *Attorney, Agent, or Firm* — Dickinson Wright, PLLC

(57) ABSTRACT

A method (100) for producing a sintered component being a solid electrolyte and/or an electrode including titanium and sulfur for an all-solid state battery, the method including mixing powders (102) so as to obtain a powder mixture comprising titanium and sulfur, pressing (106) a component with the powder mixture, sintering (108) the component under a partial pressure of sulfur comprised between 200 Pa and 0.2 MPa so as to obtain an intermediate sintered component comprising titanium and sulfur, and sintering (114) the intermediate sintered component under a partial pressure of sulfur equal to or smaller than 150 Pa at a temperature plateau comprised between 200° C. and 400° C. so as to obtain a sintered component comprising titanium and sulfur, the solid electrolyte exhibiting the peaks in positions of 2θ=15.08° (±0.50°), 15.28° (±0.50°), 15.92° (±0.50°), 17.5° (±0.50°), 18.24° (±0.50°), 20.30° (±0.50°),
(Continued)

23.44° (±0.50°), 24.48° (±0.50°), and 26.66° (±0.50°) in a X-ray diffraction measurement using CuKα line.

16 Claims, 2 Drawing Sheets

(51) Int. Cl.
*H01M 4/58* (2010.01)
*H01M 10/052* (2010.01)

(52) U.S. Cl.
CPC ....... *H01M 10/052* (2013.01); *C01P 2002/72* (2013.01); *C01P 2002/74* (2013.01); *C01P 2006/40* (2013.01); *H01M 2300/0068* (2013.01)

(58) Field of Classification Search
USPC .......................................... 429/332
See application file for complete search history.

(56) References Cited

U.S. PATENT DOCUMENTS

| | | | | |
|---|---|---|---|---|
| 2013/0040208 A1* | 2/2013 | Kanno | ..................... | H01B 1/10 |
| | | | | 429/319 |
| 2014/0037535 A1* | 2/2014 | Miyashita | ............... | C01B 17/28 |
| | | | | 423/566.2 |
| 2015/0171428 A1* | 6/2015 | Fujiki | ............... | H01M 10/0562 |
| | | | | 429/322 |
| 2016/0372785 A1* | 12/2016 | Jang | .................. | H01M 10/0525 |
| 2017/0352916 A1* | 12/2017 | Miyashita | | |

FOREIGN PATENT DOCUMENTS

| | | | | | |
|---|---|---|---|---|---|
| CN | 105514491 A | * | 4/2016 | | |
| JP | H01242456 A | | 9/1989 | | |
| JP | 4-193756 A | | 7/1992 | | |
| JP | H1197058 A | | 4/1999 | | |
| KR | 20170036793 A | * | 4/2017 | ........ | H01M 10/0562 |

OTHER PUBLICATIONS

Shin et al., All-Solid-State Rechargeable Lithium Batteries Using LiTi$_2$(PS$_4$)$_3$ Cathode with Li$_2$S—P$_2$S$_5$ Solid Electrolyte, Journal of the Electrochemical Society, 161 (1) A154-A159 (2014).

Kim et al., Lithium Intercalation into ATi$_2$(PS$_4$)$_3$ (A=Li, Na, Ag), Electrochemistry Communications 10 (2008), 497-501.

Kim et al., 3D Framework Structure of a New Lithium Thiophosphate, LiTi$_2$(PS$_4$)$_3$, as Lithium Insertion Hosts, Chem. Mater., 2008, 470-474.

* cited by examiner

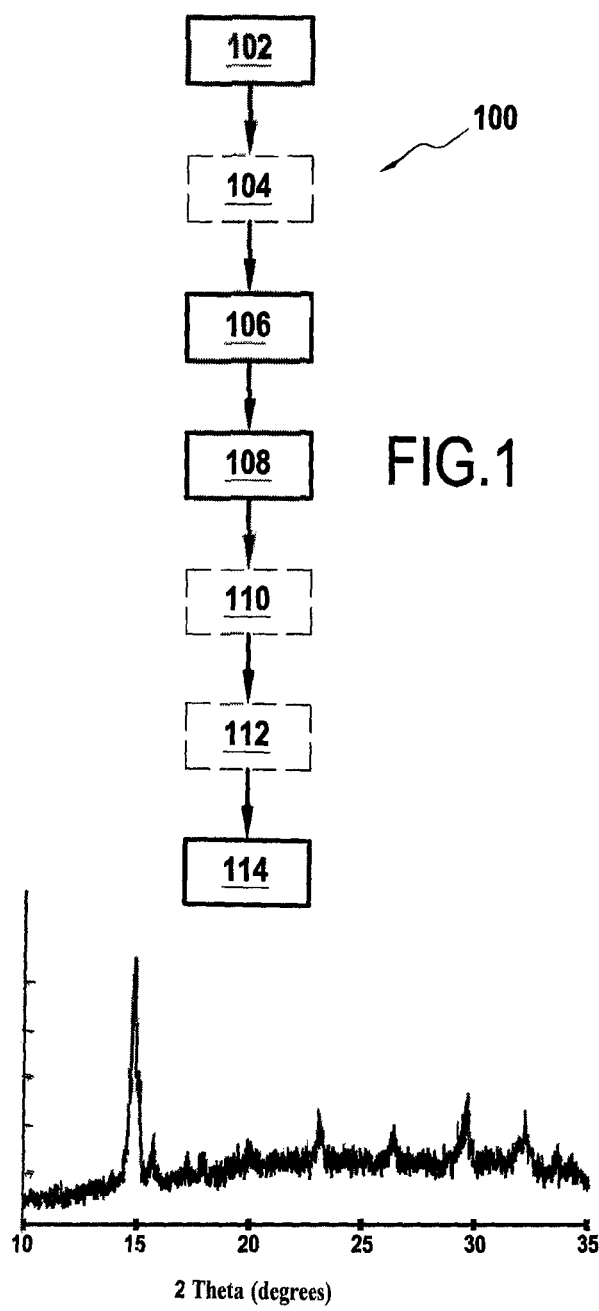
FIG.1
FIG.2
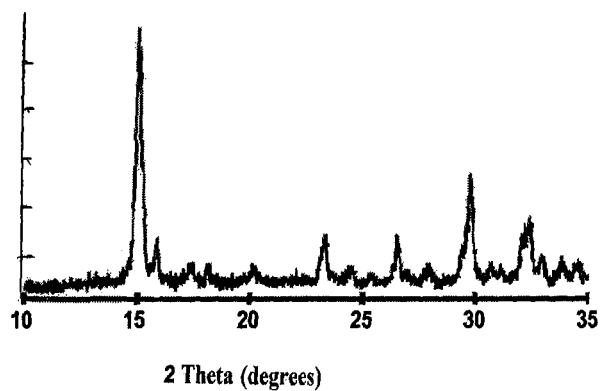
FIG.3

METHOD FOR PRODUCING ELECTRODES FOR ALL-SOLID STATE BATTERIES

RELATED APPLICATION

This application is a National Stage entry of PCT/EP2017/069858, filed Aug. 4, 2017, the entire disclosure of which is incorporated herein by reference.

FIELD OF THE DISCLOSURE

The present disclosure is related to all-solid state batteries, and more particularly to solid state batteries comprising a solid electrolyte and/or an electrode comprising sulfur.

BACKGROUND OF THE DISCLOSURE

All-solid state batteries offer the possibility of having a battery pack with high energy density.

Different materials are studied for solid electrolyte and/or electrode for all-solid state batteries. Of particular interest are materials comprising titanium and sulfur and exhibiting peaks in positions of $2\theta=15.08°$ ($\pm 0.50°$), $15.28°$ ($\pm 0.50°$), $15.92°$ ($\pm 0.50°$), $17.5°$ ($\pm 0.50°$), $18.24°$ ($\pm 0.50°$), $20.30°$ ($\pm 0.50°$), $23.44°$ ($\pm 0.50°$), $24.48°$ ($\pm 0.50°$), and $26.66°$ ($\pm 0.50°$) in a X-ray diffraction measurement using CuK$\alpha$ line. These materials generally exhibit good lithium ionic conductivity but low electronic conductivity.

However, increase of the electronic conductivity of such materials is still required for application as solid electrolyte and/or electrode.

SUMMARY OF THE DISCLOSURE

Therefore, according to embodiments of the present disclosure, a method for producing a sintered component being a solid electrolyte and/or an electrode comprising titanium and sulfur for an all-solid state battery is provided. The method comprises:
- mixing powders so as to obtain a powder mixture comprising titanium and sulfur;
- pressing a component with the powder mixture; and
- sintering the component under a partial pressure of sulfur comprised between 200 Pa and 0.2 MPa so as to obtain an intermediate sintered component comprising titanium and sulfur;
- sintering the intermediate sintered component under a partial pressure of sulfur equal to or smaller than 150 Pa at a temperature plateau comprised between 200° C. and 400° C. so as to obtain a sintered component comprising titanium and sulfur;
- wherein the sintered component exhibits the peaks in positions of $2\alpha=15.08°$ ($\pm 0.50°$), $15.28°$ ($\pm 0.50°$), $15.92°$ ($\pm 0.50°$), $17.5°$ ($\pm 0.50°$), $18.24°$ ($\pm 0.50°$), $20.30°$ ($\pm 0.50$), $23.44°$ ($\pm 0.50°$), $24.48°$ ($\pm 0.50°$), and $26.66°$ ($\pm 0.50°$) in a X-ray diffraction measurement using CuK$\alpha$ line.

According to embodiments of the present disclosure, a method for producing a sintered component being a solid electrolyte and/or an electrode comprising titanium and sulfur for an all-solid state battery is provided. The method comprises:
- mixing powders so as to obtain a powder mixture comprising titanium and sulfur;
- pressing a component with the powder mixture; and
- sintering the component under a partial pressure of sulfur comprised between 200 Pa and 0.2 MPa so as to obtain an intermediate sintered component comprising titanium and sulfur;
- sintering the intermediate sintered component under a gradient of temperature, the maximum temperature of the intermediate sintered component being comprised between 200° C. and 400° C. so as to obtain a sintered component;
- wherein the sintered component exhibits the peaks in positions of $2\theta=15.08°$ ($\pm 0.50°$), $15.28°$ ($\pm 0.50°$), $15.92°$ ($\pm 0.50°$), $17.5°$ ($\pm 0.50°$), $18.24°$ ($\pm 0.50°$), $20.30°$ ($\pm 0.50°$), $23.44°$ ($\pm 0.50°$), $24.48°$ ($\pm 0.50°$), and $26.66°$ ($\pm 0.50°$) in a X-ray diffraction measurement using CuK$\alpha$ line.

Sintered components, i.e., solid electrolytes and/or electrodes exhibiting peaks in positions of $2\theta=15.08°$ ($\pm 0.50°$), $15.28°$ ($\pm 0.50°$), $15.92°$ ($\pm 0.50°$), $17.5°$ ($\pm 0.50°$), $18.24°$ ($\pm 0.50°$), $20.30°$ ($\pm 0.50°$), $23.44°$ ($\pm 0.50°$), $24.48°$ ($\pm 0.50°$), and $26.66°$ ($\pm 0.50°$) in a X-ray diffraction measurement using CuK$\alpha$ line, generally exhibit good lithium ionic conductivity but low electronic conductivity.

By providing such methods, it is possible to obtain an intermediate sintered component in which evaporation of the sulfur during sintering is limited and in which the bulk density of the intermediate sintered component is increased, thanks to the sintering of the component being under partial pressure of sulfur comprised between 200 Pa (Pascal) and 0.2 MPa. Indeed, the evaporation of the sulfur during sintering is limited and the bulk density of the intermediate sintered component is increased. Therefore, the porosity of the intermediate sintered component is reduced.

The increase in electronic conductivity through the solid electrolyte and/or the electrode is obtained thanks to the sintering of the intermediate sintered component being under a partial pressure of sulfur equal to or smaller than 150 Pa at a temperature plateau comprised between 200° C. and 400° C. or, alternatively, thanks to the sintering of the intermediate sintered component under a gradient of temperature, the maximum temperature of the intermediate sintered component being comprised between 200° C. and 400° C.

By sintering the intermediate sintered component under a partial pressure of sulfur equal to or smaller than 150 Pa at a temperature plateau comprised between 200° C. and 400° C. or by sintering the intermediate sintered component under a gradient of temperature, the maximum temperature of the intermediate sintered component being comprised between 200° C. and 400° C., part of the sulfur present in the intermediate sintered component vaporize and part of the titanium therefore is reduced from $Ti^{4+}$ to $Ti^{3+}$ or lower, i.e., $Ti^{2+}$ or even $Ti^{+}$. Due to the reduction of the titanium, the electronic conductivity of the sintered component is increased.

In some embodiments, partial pressure of sulfur equal to or smaller than 150 Pa is obtained by flushing the intermediate sintered component with a noble gas or nitrogen.

In some embodiments, partial pressure of sulfur equal to or smaller than 150 Pa is obtained by continuous evacuation of the gas present in a closed container comprising the intermediate sintered component.

In some embodiments, the intermediate sintered component is sealed in a closed container during sintering under the gradient of temperature.

In some embodiments, the sintered component comprises $XTi_2(PS_4)_3$, X being lithium (Li), sodium (Na) or silver (Ag).

In some embodiments, the method comprises a step of amorphasizing the powder mixture so as to obtain an amorphasized powder mixture.

In some embodiments, sintering under a partial pressure of sulfur comprised between 200 Pa and 0.2 MPa comprises a sintering plateau temperature equal to or smaller than 500° C., preferably equal to or smaller than 400° C.

The powder mixture being amorphasized, the powder mixture is more reactive and sintering of the powder mixture may be obtained at temperature equal to or smaller than 500° C.

In some embodiments, sintering under a partial pressure of sulfur comprised between 200 Pa and 0.2 MPa comprises a sintering plateau time equal to or smaller than 20 hours, preferably equal to or smaller than 10 hours.

The powder mixture being amorphasized, the powder mixture is more reactive and sintering of the powder mixture may be obtained with sintering plateau time equal to or smaller than 20 hours, preferably equal to or smaller than 10 hours.

In some embodiments, the partial pressure of sulfur comprised between 200 Pa and 0.2 MPa is obtained by evaporating solid sulfur.

In some embodiments, the component is placed in a container and sealed under Argon at a pressure equal to or smaller than 100 Pa, preferably equal to or smaller than 50 Pa.

In some embodiments, the partial pressure of sulfur comprised between 200 Pa and 0.2 MPa is obtained from a sulfur containing gas.

Sulfur containing gas may be a gas such as hydrogen sulfide, carbon sulfide or phosphorous sulfide.

In some embodiments, the component is pressed at a pressure equal to or greater than 25 MPa, preferably equal to or greater than 50 MPa, more preferably equal to or greater than 75 MPa, and equal to or smaller than 500 MPa, preferably equal to or smaller than 400 MPa, more preferably equal to or smaller than 300 MPa.

In some embodiments, between the two sintering steps, the intermediate sintered component is grounded and pressed.

In some embodiments, the grounded and pressed intermediate sintered component is pressed at a pressure equal to or greater than 25 MPa, preferably equal to or greater than 50 MPa, more preferably equal to or greater than 75 MPa, and equal to or smaller than 500 MPa, preferably equal to or smaller than 400 MPa, more preferably equal to or smaller than 300 MPa.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

BRIEF DESCRIPTION OF THE DRAWINGS

FIG. 1 shows a flow chart of the method according to embodiments of the present disclosure;

FIG. 2 a X-ray diffraction spectrum of a sample according to the present disclosure;

FIG. 3 shows a X-ray diffraction spectrum of a comparative sample;

DESCRIPTION OF THE EMBODIMENTS

Figure 4:
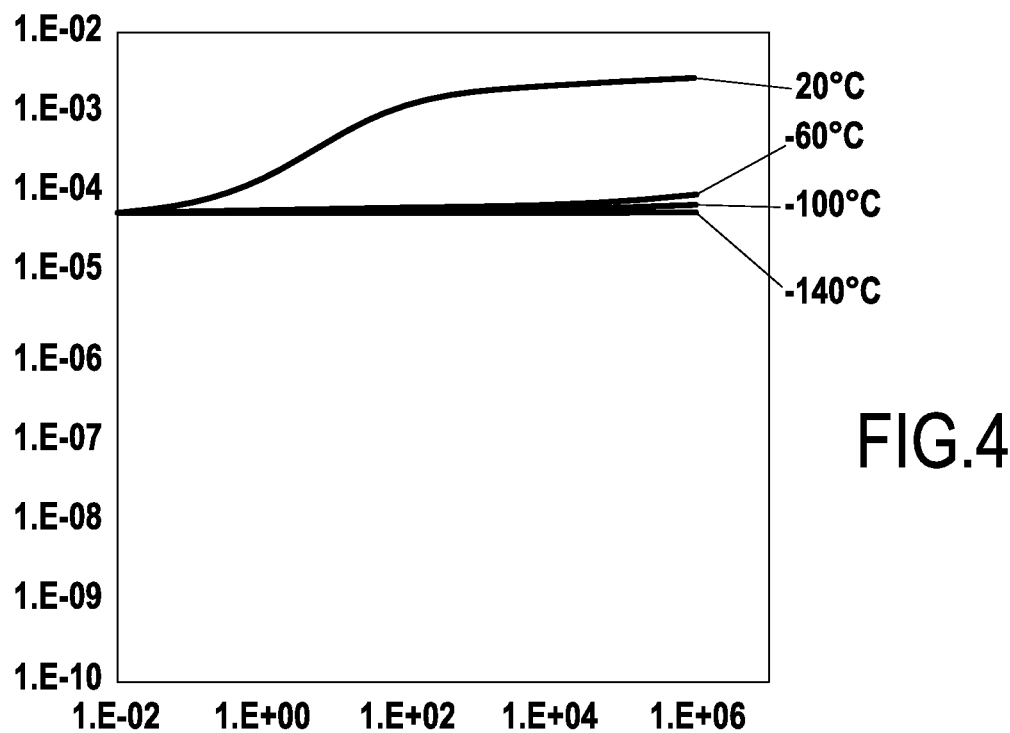
FIGS. 4 and 5 show the real part of the electric conductivity as a function of the frequency.

Reference will now be made in detail to exemplary embodiments of the disclosure, examples of which are illustrated in the accompanying drawings. Wherever possible, the same reference numbers will be used throughout the drawings to refer to the same or like parts.

FIG. 1 shows a representation of a flow chart of the method according to embodiments of the present disclosure.

Sample 1 is a sample according to the present disclosure and Sample 2 is a comparative sample.

Sample 1 and Sample 2 are both $LiTi_2(PS_4)_3$ solid electrolyte or electrode.

Every experiment is done under the argon or under vacuum or under sulfur atmosphere so as never be in contact with air.

A method 100 for producing a solid electrolyte and/or an electrode comprising titanium and sulfur for an all-solid state battery will be described in reference to FIG. 1, taking Sample 1.

In step 102, 0.0396 g (gram) of $Li_2S$, 0.5745 g of $P_2S_5$ and 0.3859 g of $TiS_2$ are mixed together so as to obtain a powder mixture. $Li_2S$ (99%, lithium sulphide, Sigma-Aldrich®), $P_2S_5$ (98%, phosphorous pentasulfide, Sigma-Aldrich®) and $TiS_2$ (99.9%, titanium disulphide, Sigma-Aldrich®) are powders having a degree of purity equal to or greater than 99 mass %.

In step 104, which is not a mandatory step, the powder mixture is amorphasized in a planetary milling equipment (Fritsch, P7). The powder mixture was disposed in a zirconium pot of 45 mL (millilitre) content with 18 zirconium balls having a diameter of 10 mm (millimetre) under Argon. The powder mixture was amorphasized for 40 hours at 370 rpm (round per minute) so as to obtain amorphasized powder mixture.

In step 106, the amorphasized powder mixture is pressed at a pressure equal to or greater than 25 MPa, preferably equal to or greater than 50 MPa, more preferably equal to or greater than 75 MPa, and equal to or smaller than 500 MPa, preferably equal to or smaller than 400 MPa, more preferably equal to or smaller than 300 MPa.

For example 100 mg of the amorphasized powder mixture is pressed at 200 MPa so as to form a component.

In step 108, the component is sintered under a partial pressure of sulfur comprised between 150 Pa and 0.2 MPa so as to obtain an intermediate sintered component comprising titanium and sulfur.

For example, the 100 mg component is put into a glass tube with 5 mg flakes of sulfur from Sigma-Aldrich® (99.99%) and the glass tube is sealed under Argon under very low pressure, for example 30 Pa. The component is sintered at a plateau temperature of 400° C. (degree Celsius) for a plateau temperature time of 8 hours so as to obtain an intermediate sintered component comprising titanium and sulfur. Upon heating, the solid flakes of sulfur allow for a partial pressure of sulfur to be comprised between 200 Pa and 0.2 MPa in the sealed glass tube.

Alternatively, the partial pressure of sulfur comprised between 150 Pa and 0.2 MPa may be obtained from a sulfur containing gas such as hydrogen sulfide ($H_2S$), carbon disulfide ($CS_2$) or phosphorous sulfide ($P_xS_y$, e.g. $P_4S_3$, $P_2S_3$ or $P_2S_5$) in a closed container, such as a sealed glass tube or in an open container with gas flush.

The intermediate sintered component is then sintered (step 114) under a partial pressure of sulfur equal to or smaller than 150 Pa at a temperature plateau comprised between 200° C. and 400° C. so as to obtain a sintered component comprising titanium and sulfur.

For example, the intermediate sintered component may be sintered in an open container under Argon atmosphere, i.e., flushing the intermediate sintered component with Argon, at a temperature plateau of 300 C for a temperature plateau time of 8 hours. Other gas such as nitrogen, helium, neon and xenon may be used.

Between the two sintering steps 108, 114, the intermediate sintered component may be grinded (step 110) and pressed (step 112). These steps 110, 112 are optional.

The pressure used in steps 106 and 112 may be different. The pressure used in steps 106 and 112 may be equal. However, the pressure in both steps 106 and 112 is equal to or greater than 25 MPa, preferably equal to or greater than 50 MPa, more preferably equal to or greater than 75 MPa, and equal to or smaller than 500 MPa, preferably equal to or smaller than 400 MPa, more preferably equal to or smaller than 300 MPa.

For example, the pressure in step 106 may be equal to 200 MPa and the pressure in step 112 may be equal to 100 MPa.

The method for producing Sample 2 is similar to the method for producing Sample 1, except that the sintering of the component and the intermediate sintered component are carried out under a partial pressure of sulfur smaller than 150 Pa.

Both the component and the intermediate sintered component are sintered at 400° C. for 8 hours under a partial pressure of sulfur or smaller than 150 Pa, for example by sealing the component and the intermediate sintered component of Sample 2 in a glass tube under Argon under very low pressure, for example 30 Pa. The sintered component of Sample 2 has therefore been sintered at 400° C. for 16 hours under a partial pressure of sulfur smaller than 150 MPa.

FIGS. 2 and 3 show X-ray diffraction spectra respectively of Sample 1 and Sample 2. As may be seen on FIGS. 3 and 4, both Sample 1 and Sample 2 exhibit the peaks in positions of 2θ=15.08° (±0.50°), 15.28° (±0.50°), 15.92° (±0.50°), 17.5° (±0.50°), 18.24° (±0.50°), 20.30° (±0.50°), 23.44° (±0.50°), 24.48° (±0.50°), and 26.66° (±0.50°) in a X-ray diffraction measurement using CuKα line.

Sample 1 and Sample 2 were each sandwiched between two SUS current collectors (Stainless steel, SUS301). Impedance of both Sample 1 and Sample 2 was measured using an impedance gain-phase analyser manufactured by Biologic. VMP3 manufactured by Biologic was used for the measurement as Frequency Response Analyzer (FRA). The measurements were started from a high-frequency range with an alternative voltage of 10 mV (millivolt) and a frequency range between 1 Hz (hertz) to 1 MHz.

The electronic conductivity of Sample 1 is equal to 6.1 $10^{-5}$ S/cm (Siemens per centimetre) whereas the ionic conductivity of Sample 2 is equal to 4.6 $10^{-10}$ S/cm.

Thus, sintering under a partial pressure of sulfur comprised between 200 Pa and 0.2 MPa, followed by a sintering allowing the sulfur to vaporize, has significantly increased the electronic conductivity of the sintered component.

Figure 5:
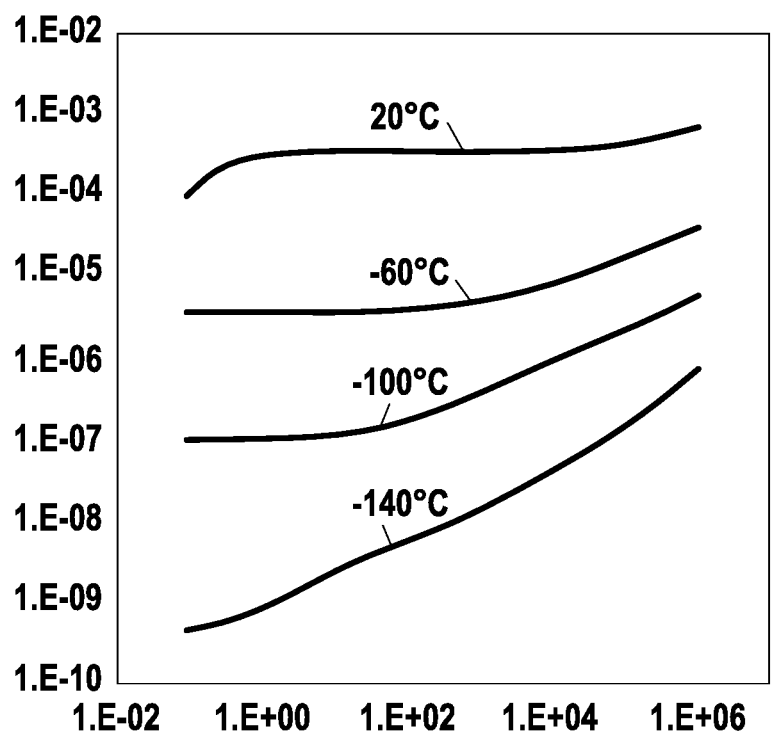

FIGS. 4 and 5 show the real part of the electric conductivity (in S/cm) as a function of the frequency (in Hz) respectively for Sample 1 and for Sample 2.

Sample 2 shows a clear temperature dependency whereas Sample 1 shows a very small temperature dependency up to temperature equal to −60° C. Since ionic conductivity is strongly dependent upon the temperature, the quasi non-dependency of the real part of electric conductivity as a function of the frequency for Sample 1 shows that the sintered component of Sample 1 exhibits an electronic conduction, the electric conductivity being the sum of the ionic conductivity and electronic conductivity.

Although Sample 1 was obtained carrying out all the steps 102-114, similar results may be obtained with or without carrying out step 104 and/or with or without carrying out steps 110 and 112.

Alternatively, the partial pressure of sulfur equal to or smaller than 150 Pa may be obtained by continuous evacuation of the gas present in a closed container comprising the intermediate sintered component.

Alternatively, the intermediate sintered component may be sintered (step 114) under a gradient of temperature, the maximum temperature of the intermediate sintered component being comprised between 200° C. and 400° C. so as to obtain a sintered component.

For example, the intermediate sintered component may be sealed in a glass tube under Argon under very low pressure, for example 30 Pa with a temperature gradient, one side of the intermediate sintered component being at 300° C. and the other side of the intermediate sintered component being at 100° C. for a sintering time of 8 hours.

When the powder mixture is not amorphasized, i.e., when step 104 is not carried out, in step 106, the powder mixture is pressed at a pressure equal to or greater than 25 MPa, preferably equal to or greater than 50 MPa, more preferably equal to or greater than 75 MPa, and equal to or smaller than 500 MPa, preferably equal to or smaller than 400 MPa, more preferably equal to or smaller than 300 MPa.

For example 100 mg of the powder mixture is pressed at 200 MPa so as to form a component.

In step 108, the component is sintered under a partial pressure of sulfur comprised between 200 Pa and 0.2 MPa so as to obtain an intermediate sintered component comprising sulfur.

For example, the 100 mg component is put into a glass tube with 5 mg flakes of sulfur from Sigma-Aldrich® (99.99%) and the glass tube is sealed under Argon under very low pressure, for example 30 Pa. The component is sintered at a plateau temperature above 500° C. (degree Celsius), for example 750° C. for a plateau temperature time of 10 hours so as to obtain an intermediate sintered component comprising titanium and sulfur.

Alternatively, the partial pressure of sulfur comprised between 200 Pa and 0.2 MPa may be obtained from a sulfur containing gas such as hydrogen sulfide ($H_2S$), carbon disulfide ($CS_2$) or phosphorous sulfide ($P_xS_y$, e.g. $P_4S_3$, $P_2S_3$ or $P_2S_5$) in a closed container, such as a sealed glass tube or in an open container with gas flush.

The conditions for the sintering 114 of the intermediate sintered component are the same as above.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A method for producing a sintered component being a solid electrolyte and/or an electrode comprising $LiTi_2(PS_4)_3$ for an all-solid state battery, the method comprising:
    mixing powders so as to obtain a powder mixture comprising titanium and sulfur;
    amorphasizing the powder mixture to obtain an amorphasized powder mixture;
    performing a first pressing of the powder mixture at a first pressure to form a component; and
    performing a first sintering of the component under a partial pressure of sulfur comprised between 200 Pa and 0.2 MPa and at a sintering temperature plateau of no more than 500° C., for a sintering time of no more than 20 hours, so as to obtain an intermediate sintered component comprising titanium and sulfur;
    performing a second sintering of the intermediate sintered component under a partial pressure of sulfur equal to or smaller than 150 Pa at a temperature plateau comprised between 200° C. and 400° C. so as to obtain a sintered component comprising titanium and sulfur;
    wherein the intermediate sintered component is ground and submitted to a second pressing at a second pressure that is different from the first pressure between the first and second sintering;
    wherein the sintered component exhibits the peaks in positions of 2θ=15.08° (±0.50°), 15.28° (±0.50°), 15.92° (±0.50°), 17.5° (±0.50°), 18.24° (±0.50°), 20.30° (±0.50°), 23.44° (±0.50°), 24.48° (±0.50°), and 26.66° (±0.50° in an X-ray diffraction measurement using CuKα line.

2. The method according to claim 1, wherein partial pressure of sulfur equal to or smaller than 150 Pa is obtained by flushing the intermediate sintered component with a noble gas or nitrogen.

3. The method according to claim 1, wherein partial pressure of sulfur equal to or smaller than 150 Pa is obtained by continuous evacuation of the gas present in a closed container comprising the intermediate sintered component.

4. The method according to claim 1, wherein the partial pressure of sulfur comprised between 200 Pa and 0.2 MPa is obtained by evaporating solid sulfur, the component being placed in a container and sealed under Argon at a pressure equal to or smaller than 100 Pa or from a sulfur containing gas.

5. The method according to claim 1, wherein the first pressing of the powder mixture is pressed at a pressure equal to or greater than 25 MPa and equal to or smaller than 500 MPa.

6. The method according to claim 1, wherein between the first and second sintering steps, the intermediate sintered component is ground and the second pressing is at a pressure equal to or greater than 25 MPa and equal to or smaller than 500 MPa.

7. A method for producing a sintered component being a solid electrolyte and/or an electrode comprising $LiTi_2(PS_4)_3$ for an all-solid state battery, the method comprising:
    mixing powders so as to obtain a powder mixture comprising titanium and sulfur;
    amorphasizing the powder mixture to obtain an amorphasized powder mixture;
    performing a first pressing of the powder mixture at a first pressure to form a component; and
    performing a first sintering of the component under a partial pressure of sulfur comprised between 200 Pa and 0.2 MPa and at a sintering temperature plateau of no more than 500° C., for a sintering time of no more than 20 hours, so as to obtain an intermediate sintered component comprising titanium and sulfur;
    performing a second sintering of the intermediate sintered component under a gradient of temperature, the maximum temperature of the intermediate sintered component being comprised between 200° C. and 400° C. so as to obtain a sintered component;
    wherein the intermediate sintered component is ground and submitted to a second pressing at a second pressure that is different from the first pressure between the first and second sintering;
    wherein the sintered component exhibits the peaks in positions of 2θ=15.08° (±0.50°), 15.28° (±0.50°), 15.92° (±0.50°), 17.5° (±0.50°), 18.24° (±0.50°), 20.30° (±0.50°), 23.44° (±0.50°), 24.48° (±0.50°), and 26.66° (±0.50° in an X-ray diffraction measurement using CuKα line.

8. The method according to claim 7, wherein the intermediate sintered component is sealed in a closed container during sintering under the gradient of temperature.

9. The method according to claim 7, wherein the partial pressure of sulfur comprised between 200 Pa and 0.2 MPa is obtained by evaporating solid sulfur, the component being placed in a container and sealed under Argon at a pressure equal to or smaller than 100 Pa or from a sulfur containing gas.

10. The method according to claim 7, wherein the first pressing of the powder mixture is pressed at a pressure equal to or greater than 25 MPa and equal to or smaller than 500 MPa.

11. The method according to claim 7, wherein between the first and second sintering steps, the intermediate sintered component is ground and the second pressing at a pressure equal to or greater than 25 MPa and equal to or smaller than 500 MPa.

12. The method according to claim 1, wherein said partial pressure of sulfur is obtained from a sulfur source selected from the group consisting of carbon disulfide and phosphorus sulfides.

13. The method according to claim 7, wherein said partial pressure of sulfur is obtained from a sulfur source selected from the group consisting of carbon disulfide and phosphorus sulfides.

14. The method of claim 1, wherein said second pressure is lower than said first pressure.

15. The method of claim 7, wherein said second pressure is lower than said first pressure.

16. The method of claim 7, wherein during the second sintering, a first side of the intermediate sintered component is at a first temperature and second side of the intermediate sintered component, different from the first side, is at a temperature different from the first temperature.

* * * * *